(12) United States Patent
Siminoff

(10) Patent No.: US 8,719,004 B2
(45) Date of Patent: May 6, 2014

(54) SYSTEMS AND METHODS FOR PUNCTUATING VOICEMAIL TRANSCRIPTIONS

(75) Inventor: James Siminoff, Pacific Palisades, CA (US)

(73) Assignee: Ditech Networks, Inc., San Jose, CA (US)

(*) Notice: Subject to any disclaimer, the term of this patent is extended or adjusted under 35 U.S.C. 154(b) by 952 days.

(21) Appl. No.: 12/727,736

(22) Filed: Mar. 19, 2010

(65) Prior Publication Data

US 2010/0241429 A1 Sep. 23, 2010

Related U.S. Application Data

(60) Provisional application No. 61/161,695, filed on Mar. 19, 2009.

(51) Int. Cl.
| | |
|---|---|
| G06F 17/20 | (2006.01) |
| G10L 15/00 | (2013.01) |
| G10L 15/18 | (2013.01) |
| G10L 21/00 | (2013.01) |
| G10L 25/00 | (2013.01) |
| G10L 15/26 | (2006.01) |
| G10L 15/04 | (2013.01) |

(52) U.S. Cl.
CPC .............. *G10L 15/265* (2013.01); *G10L 15/04* (2013.01)
USPC .................. 704/6; 704/257; 704/270

(58) Field of Classification Search
CPC ..... G10L 15/04; G10L 15/265; G06L 17/211; G06L 17/20; G06L 17/22; G06L 17/24
USPC ............................................. 704/6, 257, 270
See application file for complete search history.

(56) References Cited

U.S. PATENT DOCUMENTS

| | | | |
|---|---|---|---|
| 5,537,457 A | 7/1996 | Lantto et al. | |
| 5,768,509 A | 6/1998 | Gunluk | |
| 5,890,117 A * | 3/1999 | Silverman | 704/260 |
| 6,067,514 A * | 5/2000 | Chen | 704/235 |
| 6,308,329 B1 | 10/2001 | Takahashi | |
| 6,360,237 B1 * | 3/2002 | Schulz et al. | 715/255 |
| 6,490,561 B1 | 12/2002 | Wilson et al. | |
| 6,633,764 B1 | 10/2003 | Garcia | |

(Continued)

FOREIGN PATENT DOCUMENTS

EP          1528539 A1    5/2005

OTHER PUBLICATIONS

Elizabeth Shriberg, Andreas Stolcke, Dilek Hakkani-Tür, Gökhan Tür, Prosody-based automatic segmentation of speech into sentences and topics, Speech Communication, vol. 32, Issues 1-2, Sep. 2000, pp. 127-154, ISSN 0167-6393.*

(Continued)

*Primary Examiner* — Douglas Godbold
*Assistant Examiner* — Michael Ortiz Sanchez
(74) *Attorney, Agent, or Firm* — Holland & Knight LLP; Mark H. Whittenberger, Esq.

(57) ABSTRACT

A system, method and software product punctuates voicemail transcription text. A transcription text of the voicemail message is generated and the pauses between words of the transcribed text are determined. Ellipses are inserted into the transcription text at the position of "er" and "ahh" type words and pauses between words of the transcribed text.

13 Claims, 3 Drawing Sheets

(56) References Cited

U.S. PATENT DOCUMENTS

| | | |
|---|---|---|
| 6,718,303 B2 * | 4/2004 | Tang et al. ............... 704/235 |
| 6,937,983 B2 | 8/2005 | Romero |
| 7,016,844 B2 | 3/2006 | Othmer et al. |
| 7,046,995 B2 | 5/2006 | Rygaard |
| 7,143,441 B2 | 11/2006 | Rygaard |
| 7,164,753 B2 | 1/2007 | Engelke et al. |
| 7,167,861 B2 | 1/2007 | Majumder et al. |
| 7,580,838 B2 * | 8/2009 | Divay et al. ............... 704/257 |
| 7,996,223 B2 * | 8/2011 | Frankel et al. ............. 704/252 |
| 2002/0010916 A1 * | 1/2002 | Thong et al. ............... 725/1 |
| 2004/0138881 A1 * | 7/2004 | Divay et al. ............... 704/231 |
| 2004/0172237 A1 * | 9/2004 | Saldanha et al. ............ 704/4 |
| 2006/0223502 A1 | 10/2006 | Doulton |
| 2006/0234680 A1 | 10/2006 | Doulton |
| 2007/0054678 A1 | 3/2007 | Doulton |
| 2007/0116204 A1 | 5/2007 | Doulton |
| 2007/0117543 A1 | 5/2007 | Doulton |
| 2007/0117544 A1 | 5/2007 | Doulton |
| 2007/0117545 A1 | 5/2007 | Doulton |
| 2007/0117547 A1 | 5/2007 | Doulton |
| 2007/0153989 A1 * | 7/2007 | Howell et al. ............. 379/88.14 |
| 2010/0121638 A1 * | 5/2010 | Pinson et al. ............. 704/235 |
| 2010/0292989 A1 * | 11/2010 | Kitade et al. ............. 704/255 |

OTHER PUBLICATIONS

Burdick, Justin, "Building A Regionally Inclusive Dictionary For Speech Recognition," Computer Science & Linguistics, Spring 2004, pp. 1-5.

Burke, Moira, et al. "Error Correction of Voicemail Transcripts in SCANMail," Apr. 22-27, 2006, 10 pages.

Basson, Sara, et al. "New Accessibility Impacts," http://www.liberatedlearning.com/resources/pdf/RC_2003_IBM_SR_Paper.pdf, 2003, 8 pages.

Whittake, Steve, et al. "SCANMail: A Voicemail Interface That Mkes Speech Browsable, Readable and Searchable," Apr. 20-25, 2002, 8 pages.

Openwave Brochure, "The Value of WAP Push," Dec. 2001, 18 pages.

Openwave Brochure, Comparison of WAP Push and Short Message Service (SMS), Apr. 2002, 10 pages.

Stolcke, et al. "Recent Innovations in Speech-to-Text Transcription at SRI-ICSI-UW" IEEE Transactions on Audio, Speech, and Language Processing, vol. 14, No. 5, Sep. 2006, pp. 1-16.

* cited by examiner

SYSTEMS AND METHODS FOR PUNCTUATING VOICEMAIL TRANSCRIPTIONS

RELATED APPLICATIONS

This application claims priority to U.S. patent application Ser. No. 61/161,695, filed Mar. 19, 2009, and incorporated herein by reference.

BACKGROUND

A communication subscriber may utilize a voicemail transcription service to transcribe voicemail messages into text. Such services are known in the art and typically deliver the transcribed text via email and/or one or more text messages to the subscriber.

Typically, an automatic transcriber uses pauses within the voicemail message to indicate the end of a sentence. However, longer pauses and meaningless sounds (i.e., untranslatable words such as "er", "ahh" and "umm") are typically treated the same as short pauses. The resultant text often contains minimal punctuation and is presented as a single unbroken text block that is difficult to read.

SUMMARY

Punctuating Voicemail transcribed by Automation. When voicemail is transcribed it is not feasible to use any current punctuation models currently on the market (i.e. Microsoft Word) as voicemail does not follow a specific language pattern. We have invented a unique method to punctuate voicemail so that the reader can better interpret the message. The invention decides where to add an ellipse (three periods, i.e., . . . ) between strings.

First, the maximum number of triple dots (Y) per X amount of words is set. For example, for a message that is 30 words in length, the threshold of '. . . ' may be set to never exceed three. To place the '. . . ', hesitations in the message are identified. Hesitations are things like someone saying "um" or "ahh". So for example if the threshold is 3 '. . . ' for a message and there are two "um's" and one "ah" then these words are each replaced with '. . . '.

If there is a thirty word message and there are ten "um" and "ahh" orations, then the time that each one took to say (i.e., the time between the words on either side of the "um" or "ahh") is determined and the longest three are each replaced by ". . . ".

If there are not enough "um" or "ahh" orations in the message, then ". . . " is added between the longest pauses between words until the threshold is reached for that message.

In an embodiment, a method punctuates voicemail transcription text. A voicemail message is received from telecommunication service provider and is transcribed into a transcription text. A beginning time and an ending time of each transcribed word within the voicemail is determined and the Y largest pauses between transcribed words of the transcription text are determined, where Y is a limit on the number of ellipses to be inserted. Ellipses are inserted into the transcription text at the position of the Y largest pauses.

In another embodiment, a method punctuates voicemail transcription text. A voicemail message is received from a telecommunication service provider. The voicemail is transcribed into a transcription text and a beginning time and an ending time of each transcribed word within the voicemail is determined. Y "er" and "ahh" type words within the transcription text are identified, where Y is a limit on the number of ellipses to be inserted. Ellipses are inserted into the transcription text at the position of the Y "er" and "ahh" type words.

In another embodiment, a software product has instructions, stored on computer-readable media, wherein the instructions, when executed by a computer, perform steps for punctuating voicemail transcription text. The software product includes instructions for receiving a voicemail message from telecommunication service provider; instructions for transcribing the voicemail into a transcription text and determining a beginning time and an ending time of each transcribed word within the voicemail; instructions for identifying Y "er" and "ahh" type words within the transcription text, where Y is a limit on the number of ellipses to be inserted; and instructions for inserting ellipses into the transcription text at the position of the Y "er" and "ahh" type words.

In another embodiment, a system for punctuating voicemail transcription text, includes means for receiving a voicemail; means for transcribing audio of the voicemail into text and determining the beginning and finishing times of each transcribed word; and means for inserting ellipses into the transcribed text at Y positions each comprising an identified pause between words or a transcribed "er" and "ahh" type word.

DETAILED DESCRIPTION OF THE FIGURES

Voicemail transcription services are becoming part of every day communication. When a user of a communication device is unable to take a call, a calling party typically leaves a voicemail message for the user. Where the user subscribes to a voicemail transcription service, that voicemail may be automatically transcribed into text and sent to the user, thereby allowing the user to read the transcribed voicemail message rather than listen to the voicemail message.

While the transcription generally provides the gist of the information within the voicemail message, inflection and longer pauses within the message are typically lost. Pauses, in particular, provide additional meaning to information content within the voicemail and therefore there is a need to show these pauses within the associated transcription text.

Figure 1:
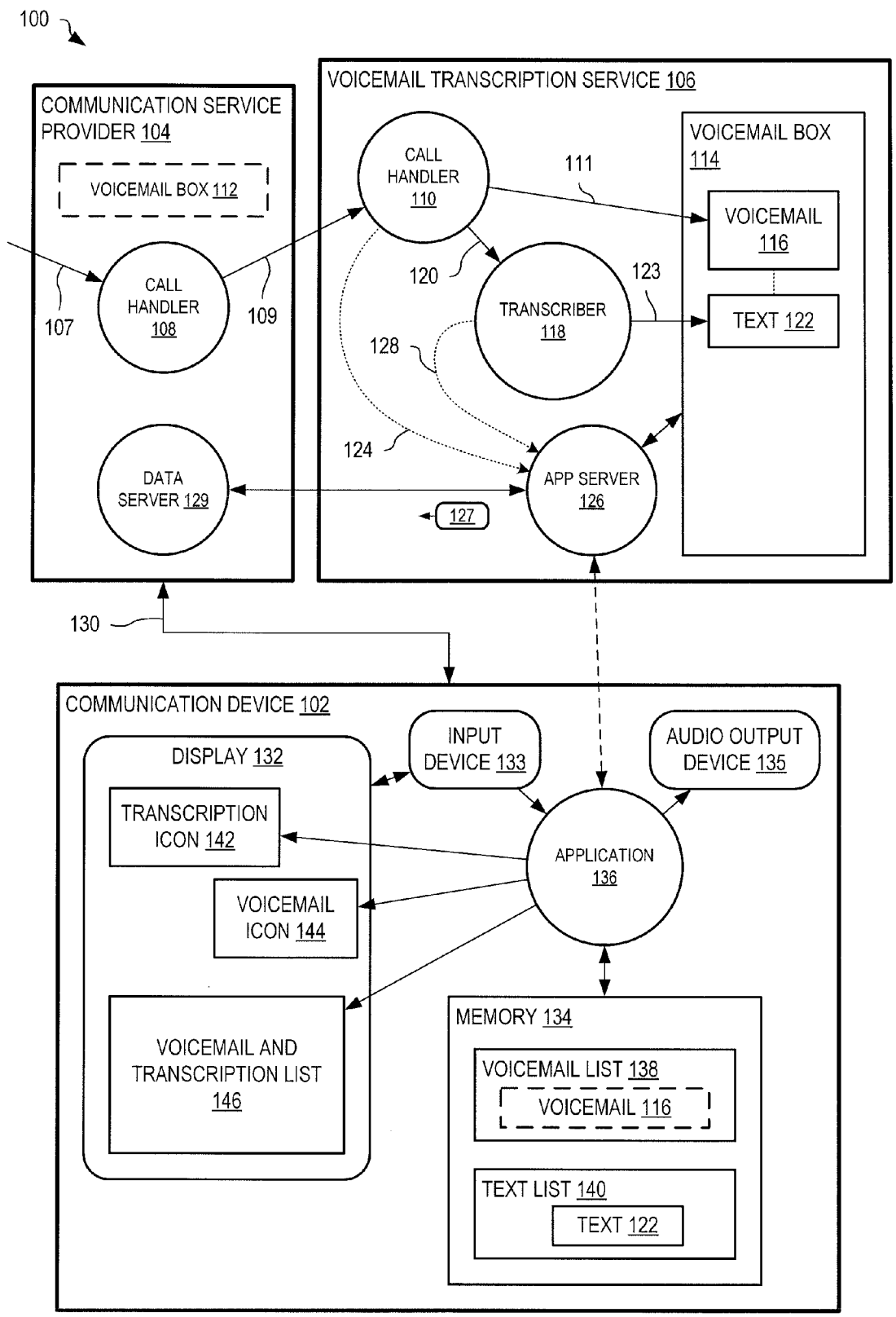
FIG. 1 shows one system embodiment for punctuating voicemail transcriptions.

FIG. 1 shows one exemplary system 100 for punctuating voicemail transcriptions. System 100 is shown with a communication device 102 of a subscriber, a communication service provider 104 and a voicemail transcription service 106.

Communication service provider 104 includes a call handler 108 that is configured to forward unanswered calls (e.g., call 107) to a call handler 110 of voicemail transcription service 106 as call 109. Communication service provider 104 is shown with a voicemail box 112 (shown in dashed outline) that is, for example, assigned to communication device 102 but unused in view of the call forwarding to voicemail transcription service 106.

Voicemail transcription service 106 also includes a voicemail box 114 associated with communication device 102. Upon receiving forwarded call 109, call handler 110 answers the call and records 111 a voicemail message 116 to voicemail box 114. Call handler 110 may simultaneously send audio 120 of the forwarded call 109 to a transcriber 118 that transcribes 123 audio 120 into text 122 for storage within voicemail box 114, in association with voicemail 116. Text 122 may be stored elsewhere within voicemail transcription service 106 without departing from the scope hereof.

Upon termination of call 109, call handler stops recording of voicemail 116 and sends a signal 124 to an application server 126 within voicemail transcription service 106, to indicate that voicemail 116 is complete. Application server 126 may then send a voicemail notification message 127, indicating the presence of voicemail 116, to communication device 102 via a data server 129 of communication service provider 104. In one embodiment, voicemail notification message 127 includes the phone number of the caller and the start date and time of the recording.

Once transcription of audio 120 is complete, transcriber 118 sends a signal 128 to application server 126 to indicate that text 122 is complete, whereupon application server 126 sends text 122 to communication device 102 via data server 129.

In one embodiment, application server 126 sends voicemail notification message 127 and text 122 to data server 129 for forwarding to communication device 102. Data server 129 then utilizes Push technology (e.g., a Push Over-The-Air (OTA) protocol, if communication device 102 is a wireless communication device) to push voicemail notification message 127 and text 122 to application 136 within communication device 102. Data server 128 may accordingly represent a push proxy gateway (PPG).

Communication device 102 is shown communicating with communication service provider 104 via a data path 130. Data path 130 may be one or more of a wired connection, a wireless connection, a fiber optic connection and other communication means without departing from the scope hereof. Communication device 102 is shown with a display 132, an input device 133, a memory 134 and an audio output device 135. Communication device 102 may include other components and devices that are for example found in smart communication devices, such as a processor, input devices, audio output devices, storage devices and/or batteries, etc. These components and devices are not shown in FIG. 1 for clarity of illustration.

Application 136 receives voicemail notification message 127 from application server 126, via data server 129, and adds voicemail notification message 127 (or information therefrom) to a voicemail list 138 within memory 134. Application 136 may also display a voicemail icon 144 on display 132 to indicate to the subscriber that a voicemail message has been stored within voicemail box 116.

In one embodiment, where memory of communication device 102 and bandwidth of data path 130 are sufficient, application server 126 may send voicemail 116 in place of voicemail notification message 127 for storage within memory 134, as shown in dashed outline within voicemail list 138.

Application 136 also receives text 122 from application server 126 via data server 129 and stores text 122 within a text list 140 in memory 134. Application 136 may then display a transcription icon 142 on display 132 to indicate to the subscriber that a new transcribed message is available.

In an embodiment, application 136 periodically polls application server 126 for voicemail 116 and text 122.

Application 136 may generate a voicemail and transcription list 146 on display 132 based upon voicemail list 138 and text list 140. Application 136 may provide functionality to list 146 to allow the subscriber to select one or more transcriptions for viewing on display 132. For example, application 136 may allow the subscriber to select one of the listed text entries of list 146 and then switch display 132 to show the associated transcription (e.g., text 122) on display 132. In another example, where the subscriber selects a voicemail entry from list 146, application 136 may send a message to application server 126 to send audio of voicemail 116 to communication device 102, whereupon it is played for the subscriber. Where memory 134 and bandwidth of data path 130 are sufficient, voicemail 116 may already be stored within memory 134, thereby allowing application 136 to immediately play the audio of voicemail 116 without further interaction with application server 126.

Once new voicemail notification messages 127 have been viewed (e.g., within voicemail and transcription list 146) by the subscriber, application 136 may remove voicemail icon 144 from display 132, until such time as a new voicemail notification message 127 is received by application 136. Similarly, once all transcription texts entries have been viewed (e.g., within voicemail and transcription list 146) by the subscriber, application 136 may remove transcription icon 142 from display 132 until such time as a new transcription text (e.g., text 122) is received by application 136.

In one embodiment, application 136 maintains only partial information of voicemail 116 and text 122 within voicemail list 138 and text list 140, respectively, thereby reducing consumption utilization of memory 134. For example, text list 140 may contain a partial translation (i.e., part of text 122, such as a first thirty characters) of voicemail 116 rather than all of text 122; if selected for viewing by the subscriber, application 136 may then respond and interact with application server 126 to retrieve the remaining part of text 122 from voicemail box 114.

Application 136 may also allow the subscriber to delete one or more voicemails (e.g., voicemail 116) and transcriptions (e.g., text 122) from memory 134. Based upon configuration of options of application 136, this may also delete these voicemails and transcriptions from voicemail box 114. For example, by interacting with voicemail list 146, the subscriber may manage lists 138 and 140 within memory 134 and stored voicemail messages (e.g., voicemail 116) and transcribed texts (e.g., text 122) within voicemail box 114.

Where text 122 is sent to communication device 102 as one or more text messages (e.g., SMS), application 136 may reassemble these text messages for storage within text list 140 as text 122. Application 136 may also manage email and SMS text messages within memory 134 and voicemail and transcription list 146.

Figure 2:
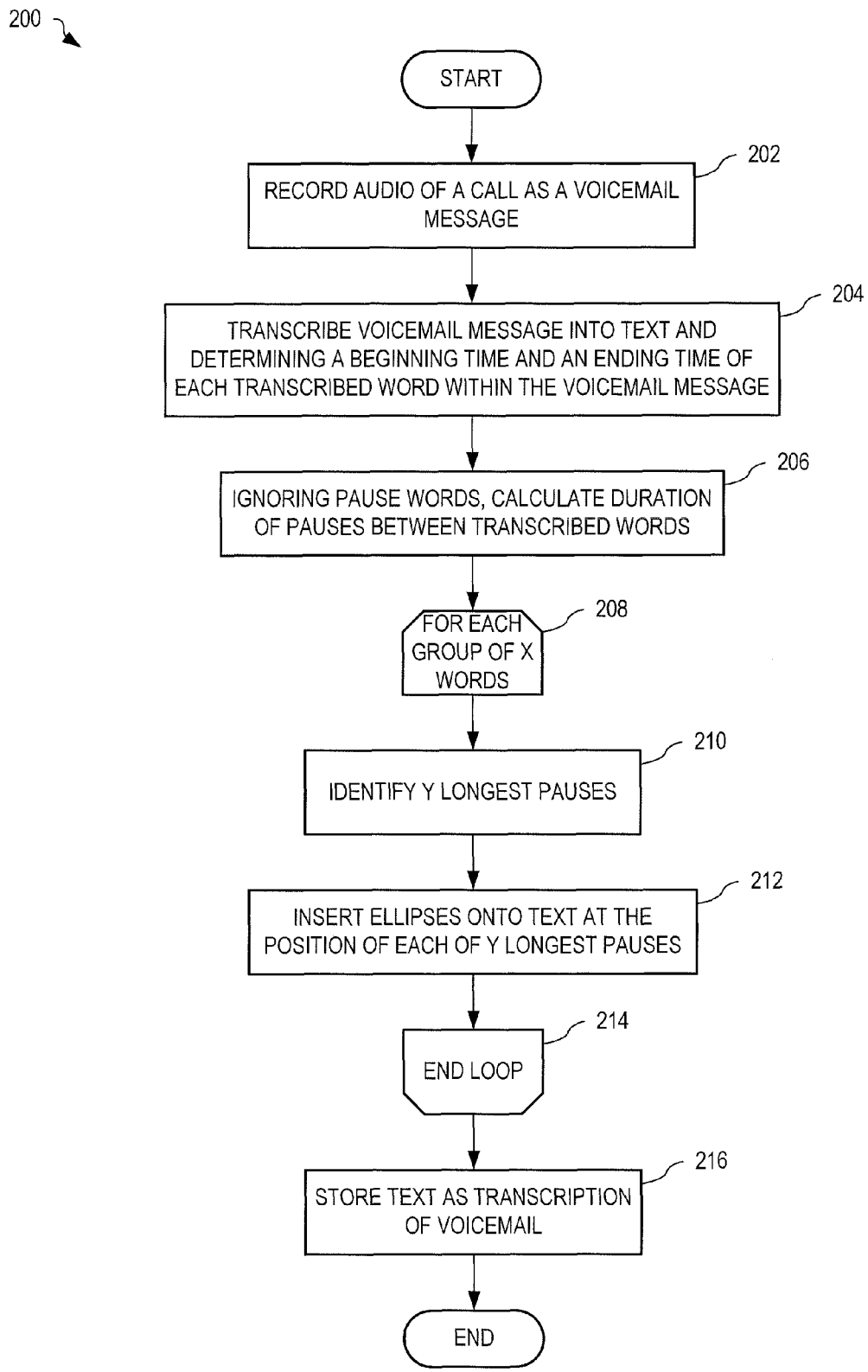
FIG. 2 is a flowchart illustrating one exemplary method for punctuating voicemail transcriptions, in an embodiment.

FIG. 2 is a flowchart illustrating one exemplary method 200 for punctuating voicemail transcriptions. Method 200 may be implemented within a voicemail transcription service (e.g., voicemail transcription service 106, FIG. 1).

In step 202, method 200 records audio of an audio call as a voicemail message. In one example of step 202, call handler 110 records 111 audio of forwarded call 109 as voicemail 116 and stores voicemail 116 within voicemail box 114. In step 204, method 200 transcribes the audio of the voicemail into text and identifies the time of both beginning and ending of each transcribed word within the voicemail message. In one example of step 204, call handler sends audio 120 of forwarded call 109 to transcriber 118, which transcribes the audio into text 122.

Steps 202 and 204 may occur concurrently; that is, while the audio of the forwarded message is recorded as a voicemail message, the audio may be concurrently transcribed into text. Transcriber 118 may produce a data structure containing the word list with start and stop times, or transcriber 118 may produce a text block of transcription and an additional list of times. In step 206, the duration of pauses between transcribed words is calculated, ignoring pause words such as "er," "um," "uhh," "ah" and like orations (also referred to hereafter as "err" and "ah" type words)

Steps 208 through 214 form a loop for searching the transcribed text to identify Y longest pauses (step 210), the pauses including "err" and "ah" type words, and to insert ellipses into the test at the position of each of the Y longest pauses (step 212). The resultant text is stored as the transcription of the voicemail, in step 216.

Figure 3:
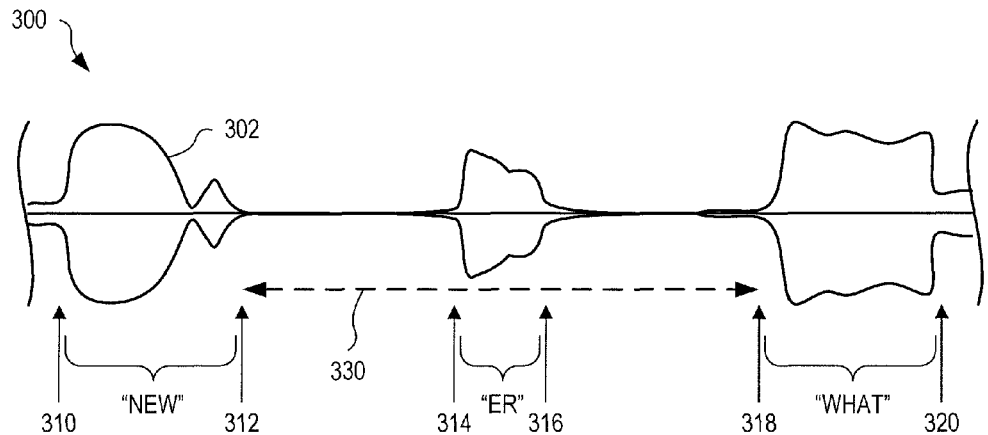
FIG. 3 shows a graph of one exemplary part of the audio of the voicemail message of FIG. 1, in an embodiment.

FIG. 3 shows a graph 300 of one exemplary audio part 302 of the voicemail 116 of FIG. 1. In particular, graph 300 shows audio part 302 and its associated text (e.g., part of text 122) as transcribed by transcriber 118. A word "NEW" is transcribed and has a beginning time 310 and an end time 312. A pause then occurs and the word "ER" is transcribed with a beginning time 314 and an end time 316. Another pause occurs and then a word "WHAT" is transcribed with a beginning time 318 and an end time 320. A pause 330 between the "NEW" word and the "WHAT" word is determined from the difference between end time 312 and beginning time 318.

Figure 4:
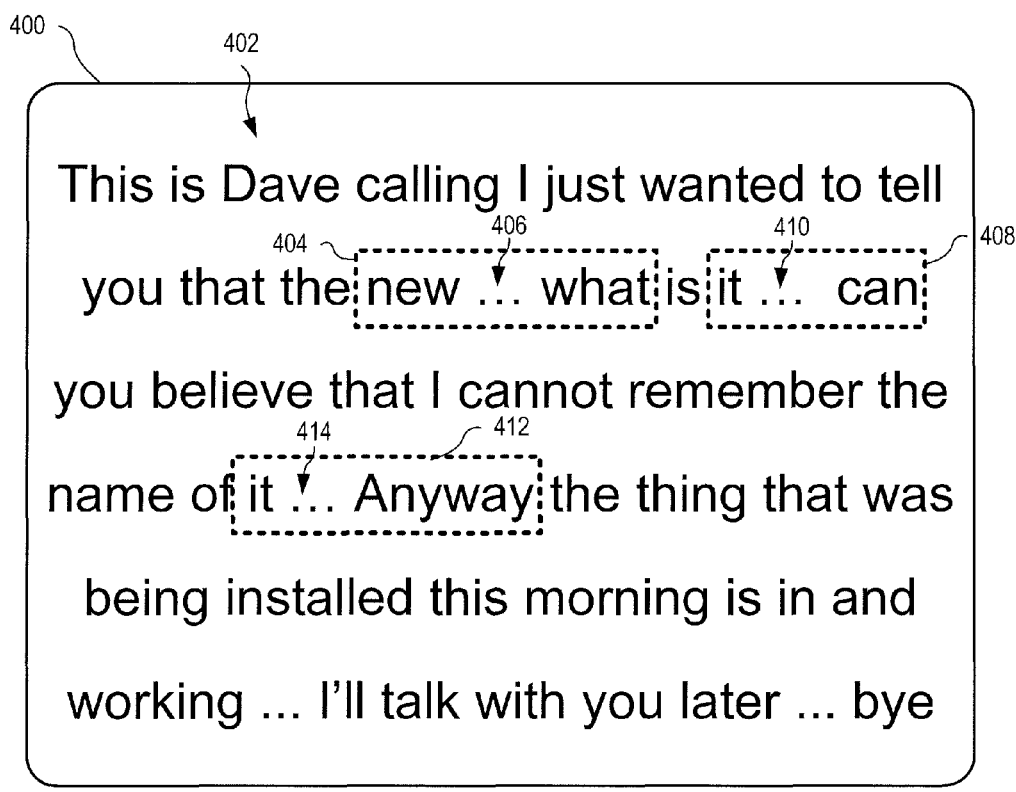
FIG. 4 shows exemplary transcription text resulting from the method of FIG. 2, in an embodiment.

FIG. 4 shows exemplary transcription text 402 resulting from the method of FIG. 2, in an embodiment. Text 402 is shown within a display 400 of a mobile device, for example, and may represent text 122 of FIG. 1. Text 402 is shown with five ellipses (". . . ") inserted to indicate pauses in speech and/or the use of "um", "ahh" and such words ("err" and "ah" type words). Using the example of FIG. 3 as indicated by dashed outline 404, the transcribed "ER" word is replaced by ellipse 406. Similarly, within dashed outline 408, a pause between words "it" and "can" results in the insertion of ellipse 410. Similarly again, within dashed outline 412 an ellipse 414 is inserted between words "it" and "Anyway". Dashed outlines 404, 408 and 412 are for illustrative purposes and are not displayed with text 402 on display 400.

Where a threshold is included, the threshold may specify a number Y of ellipses that may be inserted for each X words of transcribed text, for example. Where the number of transcribed "er" and "ahh" type words is less than Y, these words may be replaced with ellipses and additional ellipses may be inserted between words with the largest pause until Y is reached. Where the number of transcribed "er" and "ahh" types words is greater than Y, the Y "er" and "ahh" type words having the largest pause between surrounding words (e.g., pause 330, FIG. 3) are replaced by ellipses.

Changes may be made in the above methods and systems without departing from the scope hereof. It should thus be noted that the matter contained in the above description or shown in the accompanying drawings should be interpreted as illustrative and not in a limiting sense. For example, other symbols or characters may be used in place of ellipses and other thresholds may be defined for their insertion without departing from the scope hereof The following claims are intended to cover all generic and specific features described herein, as well as all statements of the scope of the present method and system, which, as a matter of language, might be said to fall therebetween.

What is claimed is:

1. A method for punctuating voicemail transcription text, comprising:
   receiving, at a device, a voicemail message from telecommunication service provider;
   transcribing, via the device, the voicemail into a transcription text and determining a beginning time and an ending time of each transcribed word within the voicemail;
   identifying Y largest pauses between transcribed words of the transcription text, where Y is a limit on the number of ellipses to be inserted; and
   inserting ellipses into the transcription text at the position of the Y largest pauses wherein the Y largest pauses is a number smaller than a total number of pauses of the transcription text.

2. The method of claim 1, wherein the pauses include sounds.

3. The method of claim 1, wherein the pauses include hesitations.

4. The method of claim 1, further comprising storing the transcription text at a storage device.

5. A software product comprising instructions, stored on non-transitory computer-readable media, wherein the instructions, when executed by a computer, perform steps for punctuating voicemail transcription text, comprising:
   instructions for receiving, at a device, a voicemail message from telecommunication service provider;
   instructions for transcribing, via the device, the voicemail into a transcription text and determining a beginning time and an ending time of each transcribed word within the voicemail;
   instructions for identifying Y largest pauses within the transcription text, where Y is a limit on the number of ellipses to be inserted; and
   instructions for inserting ellipses into the transcription text at the position of the Y largest pauses wherein the Y largest pauses is a number smaller than a total number of pauses of the transcription text.

6. The software product of claim 5, wherein the pauses include sounds.

7. The software product of claim 5, wherein the pauses include hesitations.

8. The software product of claim 5, further comprising storing the transcription text at a storage device.

9. A system for punctuating voicemail transcription text, comprising:
   means for receiving a voicemail at a device;
   means for transcribing, via the device, audio of the voicemail into transcription text and determining the beginning and finishing times of each transcribed word; and
   means for identifying the Y largest pauses between transcribed words of the transcription text, where Y is a limit on the number of ellipses to be inserted; and
   means for inserting ellipses into the transcription text at the position of the Y largest pauses wherein the Y largest pauses is a number smaller than a total number of pauses of the transcription text.

10. The system of claim 9, wherein the pauses include sounds.

11. The system of claim 9, wherein the pauses include hesitations.

12. The system of claim 9, further comprising storing the transcription text at a storage device.

13. A method for punctuating voicemail transcription text, comprising:
   receiving, at a device, a voicemail message from telecommunication service provider;
   transcribing, via the device, the voicemail into a transcription text and determining a beginning time and an ending time of each transcribed word within the voicemail;
   identifying Y pauses within the transcription text, where Y is a limit on the number of ellipses to be inserted; and
   inserting punctuation between a first word and a second word of the transcription text at the position of the Y pauses in order to indicate a hesitation, wherein the Y largest pauses is a number smaller than a total number of pauses of the transcription text.

* * * * *